(12) United States Patent
Tsui et al.

(10) Patent No.: US 7,573,154 B2
(45) Date of Patent: Aug. 11, 2009

(54) BATTERY OPERATED PORTABLE ELECTRONIC DEVICE HAVING DUAL BATTERIES

(75) Inventors: Chi-Ying Tsui, Hong Kong SAR (CN); Fuk Sheung Fung, Hong Kong SAR (CN)

(73) Assignee: Perception Digital Limited, Hong Kong SAR (CN)

( * ) Notice: Subject to any disclaimer, the term of this patent is extended or adjusted under 35 U.S.C. 154(b) by 0 days.

(21) Appl. No.: 11/668,632

(22) Filed: Jan. 30, 2007

(65) Prior Publication Data

US 2008/0179957 A1 Jul. 31, 2008

(51) Int. Cl.
*H01M 10/46* (2006.01)

(52) U.S. Cl. .............................. 307/42; 307/43; 307/66; 320/103; 320/125; 320/126; 320/127; 320/128; 320/137; 320/139; 320/140; 320/166; 320/167; 455/572; 455/573; 455/574

(58) Field of Classification Search .................... 307/66; 455/572–574; 320/103, 137, 125–128, 139–140, 320/166–167
See application file for complete search history.

(56) References Cited

U.S. PATENT DOCUMENTS

| | | | | |
|---|---|---|---|---|
| 5,396,637 A | * | 3/1995 | Harwell et al. | 365/228 |
| 5,818,200 A | * | 10/1998 | Cummings et al. | 320/116 |
| 5,929,602 A | * | 7/1999 | Suzuki | 320/116 |
| 6,057,666 A | | 5/2000 | Dougherty et al. | |
| 6,222,341 B1 | | 4/2001 | Dougherty et al. | |
| 6,271,642 B1 | * | 8/2001 | Dougherty et al. | 320/104 |
| 6,331,365 B1 | * | 12/2001 | King | 429/9 |
| 6,452,361 B2 | * | 9/2002 | Dougherty et al. | 320/104 |
| 6,765,746 B2 | * | 7/2004 | Kusumoto | 360/75 |
| 6,864,664 B2 | * | 3/2005 | Clift | 320/128 |
| RE38,777 E | | 8/2005 | Adams et al. | |
| 7,038,333 B2 | * | 5/2006 | Bourilkov et al. | 307/46 |
| 7,136,701 B2 | | 11/2006 | Greatbatch et al. | |
| 7,236,873 B2 | * | 6/2007 | Kuang et al. | 701/110 |
| 7,327,119 B2 | * | 2/2008 | Stephenson, III | 320/103 |
| 7,328,307 B2 | * | 2/2008 | Hoogterp | 711/114 |
| 7,444,184 B2 | * | 10/2008 | Boveja et al. | 607/40 |
| 2005/0040787 A1 | * | 2/2005 | Choi | 320/103 |
| 2005/0116686 A1 | * | 6/2005 | Odaohhara | 320/116 |
| 2006/0209444 A1 | * | 9/2006 | Song et al. | 360/31 |
| 2007/0210735 A1 | * | 9/2007 | Bayne et al. | 318/376 |
| 2008/0007219 A1 | * | 1/2008 | Williams | 320/116 |
| 2008/0089012 A1 | * | 4/2008 | Kon et al. | 361/502 |
| 2008/0129219 A1 | * | 6/2008 | Smith et al. | 315/291 |
| 2008/0197801 A1 | * | 8/2008 | Manor et al. | 320/103 |

* cited by examiner

*Primary Examiner*—Stephen W Jackson
*Assistant Examiner*—Adi Amrany
(74) *Attorney, Agent, or Firm*—Leydig, Voit & Mayer, Ltd.

(57) ABSTRACT

A battery-operated portable electronic device has a primary battery to provide energy to low current circuitry of the portable device, and a supplemental battery to provide intermittent bursts of energy to other components of the portable device. A charging device charges the supplemental battery from the primary battery. An electronic device employing the battery system may have a battery compartment for the primary battery, which can be an AAA, AA, C, or D size battery.

14 Claims, 2 Drawing Sheets

BATTERY OPERATED PORTABLE ELECTRONIC DEVICE HAVING DUAL BATTERIES

BACKGROUND TO THE INVENTION

1. Field of the Invention

The current invention relates to a battery operated portable electronic device having dual batteries, and more particularly to a portable battery operated device storing data for retrieval be a user of the device. The invention also relates to battery systems for portable electronic device.

2. Background Information

As the size of portable electronic devices decreases and the complexity of the tasks required of them increases significant pressure is put on battery life. Battery technology has improved greatly over the years with storage capacities increasing and size reducing. However, much of the disadvantages associated with battery life are inherent in the operating requirements of modern electronic devices. Traditional analogue devices draw a steady current, however modern digital devices can load a battery with short, high current spikes. The current a battery can deliver is dependent on its state of charge and internal resistance. In many instances although a battery still has stored energy available it is unable to supply this energy in the way required by modern portable device.

A good example of this problem can be found in modern portable music players. Many consumers now demand a device with very high media storage capacity. Due to the high cost of large capacity solid-state storage mediums many manufacturers use small form hard disk drives (HDDs) in their device. HDDs consume significant amounts of power. To increase battery life a small solid-state memory module is also included to which blocks of data are copied from the HDD so that the HDD need only operate intermittently. This small solid-state memory module might hold, say, 4 minutes worth of playback data so that every 4 minutes the HDD must be turned on for a very short period to copy a new block of data to the solid-state memory module. The normal operating requirements of the device is typically only a few tens of milliamps but rises to hundreds of milliamps during operation of the HDD.

The remaining charge in the device battery is typically determined by measuring the battery output voltage. However, as battery state of charge decreases output voltage drops significantly at high operating currents and so this method becomes unreliable due to the periodic and variable operation of the HDD. Therefore, to ensure proper shutdown of the device this must occur when the measured battery state of charge indicates at least 10% charge left. If it were not for the periodic and variable high currents required by the HDD shutdown would not need to occur until the battery state of charge reached 1%-2%.

FIG. 1 shows the discharge characteristic of a typical Lithium Ion battery to illustrate this problem. The voltage at 90% capacity drops from 3.5V to 3.0V when the current drawn varies from 0.5 C to 2 C. In comparison at 90% capacity the voltage is close to 3.7V when the current drawn is less than 0.2 C.

Another disadvantage with this type of device is that the periodic and variable high currents required by the HDD prevent the use of cheaper non-rechargeable carbon-zinc or zinc-chloride batteries (sometime called Leclanché cells) due to their large internal resistance. More costly alkaline batteries can be used, but battery life will be short due to the short, high current nature of operation.

SUMMARY OF THE INVENTION

It is an object of the present invention to provide portable battery operated electronic device that overcomes or at least ameliorates some of the above problems.

There is disclosed herein a battery system for a portable battery operated device storing data for retrieval by a user of the device comprising a hard disk drive having a first storage capacity for storing data in the portable device, a solid-state memory module having a second storage capacity, smaller than the first storage capacity, for temporarily storing blocks of data being retrieved, a output module for outputting the blocks of data temporarily stored by the solid-state memory module to a user of the device, a copy module for intermittently copying blocks of data from the hard disk drive to the solid-state memory module for outputting by the output module, a primary battery employed to provide energy to the portable device, but not directly to the hard disk drive, a supplemental energy storage device employed to provide intermittent periods of energy to the hard disk drive during copying of the blocks of data from the hard disk drive to the solid-state memory module, and charger module for charging the supplemental energy storage device from the primary battery between the copying of the blocks of data.

Preferably, the output module and the copy module are functions of a microcontroller.

Preferably, the primary battery has a first energy storage capacity and the supplemental battery has a second energy storage capacity that smaller than the first energy storage capacity.

Preferably, the second energy storage capacity is sufficient to supply only a single intermittent period of energy to the hard disk drive for copying a single block of media data from the hard disk drive to the solid-state memory module, wherein thereafter the supplemental battery must be charged from the primary battery before a further copying of a block of media data from the hard disk drive to the solid-state memory module.

Preferably, the supplemental battery is a super capacitor.

Preferably, the supplemental battery is a battery having a high energy characteristic.

Preferably, the primary battery is selected from a group comprising a rechargeable nickel-cadmium (NiCd) battery, a rechargeable nickel-metal-hydride (NiMH) or a rechargeable lithium-ion (Li-ion) battery.

Preferably, the primary battery is selected from a group comprising a non-rechargeable carbon-zinc battery or non-rechargeable zinc-chloride battery or a non-rechargeable alkaline battery.

Preferably, the device further comprises a battery compartment accessible by a user of the device for locating the primary battery, and wherein the battery compartment is configured to receive a non-rechargeable household type battery to function as the primary battery.

Preferably, the device is a portable media player.

Further aspects of the invention will become apparent from the following description.

BRIEF DESCRIPTION OF THE DRAWINGS

A preferred form of the present invention will now be described by way of example with reference to the accompanying drawing in which.

DETAILED DESCRIPTION OF THE DRAWINGS

Figure 1:
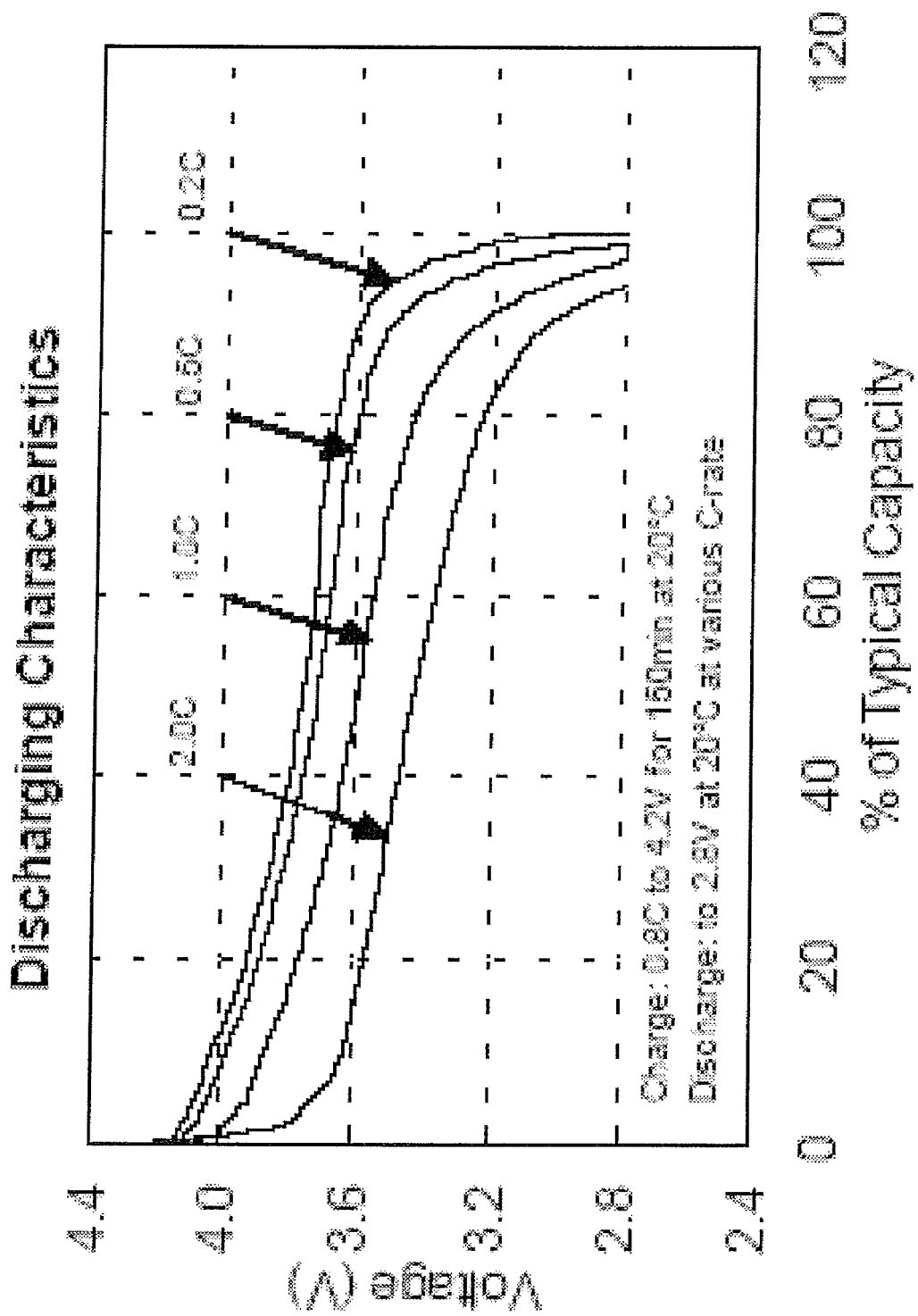
FIG. 1 illustrates the discharge characteristic of a typical Lithium Ion battery.
Figure 2:
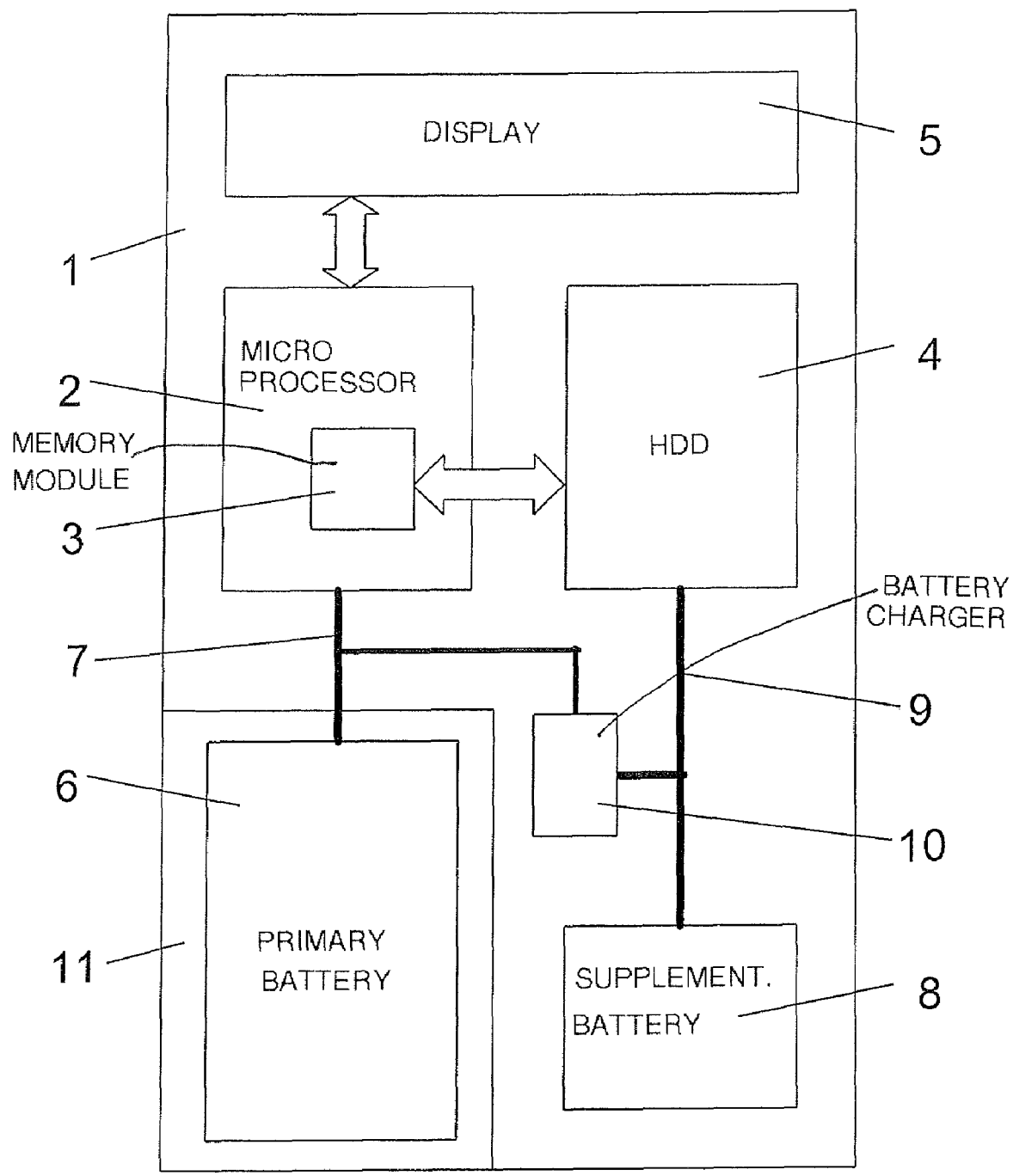
FIG. 2 illustrates a battery system according to the invention as practiced with a portable music (MP3) player device.

For purpose of illustration the present invention will be described as practiced in a portable music (MP3) player device which is schematically illustrated in the attached drawings. This is not intended to limit the scope or functionality of the invention. The skilled addressee will understand that the invention can be equally employed by any portable device having a component, such as a hard disk drive, that requires a burst of high energy to operate, and which component stores data for retrieval by a user of the device. Such a device could be a mobile phone that stores phonebook/contact data; a PDA that stores business/personal data; a GPS navigation device that stores route data; a media device that stores video, photo or audio data; or a laptop or handheld computer that stores file data. All such devices can store said data on a hard disk drive and require the stored data to be retrieved and output to the user.

The portable music player 1 comprises control circuitry, such as a microprocessor 2, a solid-state memory module 3 for temporary storage of data used by the microprocessor 2 and a large capacity hard disk drive (HDD) storage medium 4 for permanent (or quasi permanent) storage of data in the device. An output display 5 is depicted connected to the microprocessor 2. The music player 1 also has user input buttons, an audio headphone socket and a PC connection interface which are not essential to illustration of the invention and so not depicted. The microprocessor 2 can perform various functions of the device via programmed software modules as is known in the art. In the described media player these include an output module for reading audio data in the solid-state memory module 3 and performing audio playback of the data via the audio headphone socket, and a copy module for intermittently copying fresh blocks of audio data from the HDD 4 to the solid-state memory module 3 for playback.

The depicted music player 1 works as discussed in the background section. The solid-state memory module 3 has a capacity sufficient to store data for several minutes of audio playback. For the purpose of illustrating the invention it is assumed that it is four minutes playback, but this is not essential to the invention. Intermittently during playback, in this case about every four minutes, a new block of playback data is copied from the HDD 4 to the solid-state memory module 3. This copying function takes only a few seconds. To increase energy efficiency of the device the HHD 4 remains off for most of the playback operation and is turned on only intermittently during the copying function. The arrangement and operation of the device discussed thus far is well known and within the understanding and ability of someone of ordinary skill in the art.

The music player 1 has two batteries. A primary battery 6 having a characteristic for long term energy delivery is connected to a first power supply circuit 7 for operating the main functional components such as microprocessor 2 and solid-state memory module 3. There is also a smaller supplemental battery 8, which may be a small capacity high energy characteristic battery, super capacitor or similar device. The supplemental battery 8 is connected to a second power supply circuit 9 to provide intermittent bursts of high energy needed to operate the HDD 4. The energy capacity of the supplemental battery 8 is much lower than that of the primary battery 6. At a minimum the supplemental battery 8 need only have sufficient capacity to operate the HDD 4 for the few seconds it takes to make a single copy transfer of data to the solid-state memory module 3. Because the HDD 4 is off for most of the playback there is sufficient time between copying operations to recharge the supplemental battery 8.

A super capacitor uses no chemical reactions. It uses a special kind of carbon, carbon aerogel, which has a large molecular surface area that can hold a large amount of electrostatic energy. This energy can be released very rapidly at high current. A super capacitor is suited to use as the supplemental battery due to its cheap costs and because it does not involve a chemical reaction it can be recharged hundreds of thousands of times without degradation.

The device also includes an internal battery charging device 10 for charging the supplemental battery 8 from the primary battery 6 between copying operations. The charging device 10 is of a known type that will accumulate a high charge within supplemental battery 8 using a low charge current in the period between copying operations. Because the supplemental battery 8 need only be sufficiently large to operate the HDD 4 for a few second before recharge it will not add significantly to the size or cost of the device. The supplemental battery 8 is recharged at a lower current over the much longer period when the HDD 4 is turned off. In this way the supplemental battery 8 and charger 10 serve to even out the peek energy demands that might be placed on the primary battery 6 meaning that it can continue to operate the music player 1 beyond the state of charge where the music player 1 would otherwise need to be shutdown.

Typically in the system of the invention the device may be operated until the state of charge of the primary battery 6 reaches 1-2%. This is 8% lower than is typical in the art, which would add an extra 1.78 hours battery life over a device using a prior art battery arrangement with a rated to battery life of 20 hours.

In the preferred embodiment of the invention the primary battery is a rechargeable nickel-cadmium (NiCd), nickel-metal-hydride (NiMH) or lithium-ion (Li-ion) battery typical in this type of device. However, because the invention smoothes out intermittent bursts of high current it is possible to employ non-rechargeable carbon-zinc, zinc-chloride or alkaline batteries as the primary battery. These batteries are cheap and readily available in typical household battery configurations such as AAA, AA, C and D sizes.

In the alternative embodiment the primary battery 6 has an AA household battery shape and is located in a battery compartment 11 accessible by a user of the device. The primary battery 6 is a rechargeable nickel-cadmium (NiCd) or nickel-metal-hydride (NiMH) battery supplied with the device. However, if the user has forgotten to recharge the battery, or is traveling to or in a location without access to electricity to recharge the battery, they can temporarily exchange the rechargeable nickel-cadmium (NiCd) or nickel-metal-hydride (NiMH) battery for a non-rechargeable carbon-zinc, zinc-chloride or alkaline battery to continuing enjoying use of the device.

It should be appreciate that modifications and alternations obvious to those skilled in the art are not to be considered as beyond the scope of the present invention.

What is claimed is:

1. A portable device that is battery operated and stores data for retrieval, the portable device comprising:
   a hard disk drive having a first data storage capacity and storing data in the portable device,
   a solid-state memory module having a second data storage capacity, smaller than the first data storage capacity, temporarily storing blocks of data being retrieved,
   an output module outputting the blocks of data temporarily stored by the solid-state memory module, a copy module intermittently copying blocks of data from the hard disk drive to the solid-state memory module to be output by the output module, a primary battery having a first energy storage capacity and providing energy directly to the solid-state memory module, a supplemental energy storage device having a second energy storage capacity and providing energy directly to the hard disk drive in intermittent periods when the blocks of data are being copied from the hard disk drive to the solid-state memory module, wherein the first energy storage capacity is larger than the second energy storage capacity, and a charger module charging the supplemental energy storage device, from the primary battery, when blocks of data are not being copied from the hard disk drive to the solid-memory state module by the copy module, wherein an electrical current supplied by the supplemental energy storage device to operate the hard disk drive intermittently is larger than a charging current supplied by the primary battery through the charger module to charge the supplemental energy storage device.

2. The portable device of claim 1 comprising a microprocessor including the output module and the copy module.

3. The portable device of claim 1 wherein the supplemental energy storage device is a super capacitor.

4. The portable device of claim 1 wherein the primary battery is selected from the group consisting of a rechargeable nickel-cadmium (NiCd) battery, a rechargeable nickel-metal-hydride (NiMH), and a rechargeable lithium-ion (Li-ion) battery.

5. The portable device of claim 1 wherein the primary battery is selected from the group consisting of a non-rechargeable carbon-zinc battery, a non-rechargeable zinc-chloride battery, and a non-rechargeable alkaline battery.

6. The portable device of claim 5 further comprising a battery compartment accessible by a user of the portable device for holding the primary battery, wherein the battery compartment is configured to receive a non-rechargeable battery to function as the primary battery.

7. The portable device of claim 1 which is a portable media player.

8. The portable device of claim 1 wherein the charger module charges the supplemental energy storage device only when the hard disk drive is not operating, between periods when blocks of data are being copied from the hard disk drive.

9. The portable device of claim 1 wherein the primary battery does not provide energy directly to the hard disk drive and the supplemental energy storage device does not provide energy directly to the solid-state memory module.

10. A portable media player comprising:
a hard disk drive having a first data storage capacity and storing media data in the media player,
a solid-state memory module having a second data storage capacity, smaller than the first data storage capacity, temporarily storing blocks of media data,
a player module for playback of the blocks of media data temporarily stored by the solid-state memory module,
a copy module intermittently copying blocks of media data from the hard disk drive to the solid-state memory module during the playback,
a primary battery having a first energy storage capacity and providing energy directly to the solid state memory,
a supplemental energy storage device having a second energy storage capacity and providing energy directly to the hard disk drive in intermittent periods when the blocks of media data are being copied from the hard disk drive to the solid-state memory module, wherein the first energy storage capacity is larger than the second energy storage capacity, and
a charger module for charging the supplemental energy storage device, from the primary battery, when blocks of media data are not being copied from the hard disk drive to the solid-state memory module by the copy module, wherein an electrical current supplied by the supplemental energy storage device to operate the hard disk drive intermittently is larger than a charging current supplied by the primary battery through the charger module to charge the supplemental energy storage device.

11. The media player of claim 10 wherein the charger module charges the supplemental energy storage device only when the hard disk drive is not operating, between periods when blocks of data are being copied from the hard disk drive.

12. The media player of claim 10 wherein the primary battery does not provide energy directly to the hard disk drive and the supplemental energy storage device does not provide energy directly to the solid-state memory module.

13. A portable device that is battery operated, comprising:
a hard disk drive storing data in the portable device and having a first data storage capacity,
a solid-state memory module having a second data storage capacity, smaller than the first data storage capacity, temporarily storing blocks of data being retrieved,
a primary battery providing energy directly to the solid-state memory device, the primary battery having a first energy storage capacity,
a supplemental energy storage device providing energy directly to the hard disk drive only during operation of the hard disk drive, the supplemental energy storage device having a second energy storage capacity smaller than the first energy storage capacity, and
a charger supplying energy from the primary battery to the supplemental energy storage device only during periods when the supplemental energy storage device is not providing energy to the hard disk drive, wherein an electrical current supplied by the supplemental energy storage device to operate the hard disk drive intermittently is larger than a charging current supplied by the primary battery through the charger to charge the supplemental energy storage device.

14. The portable device of claim 13 wherein the primary battery does not provide energy directly to the hard disk drive and the supplemental energy storage device does not provide energy directly to the solid-state memory module.

* * * * *